United States Patent
Kim et al.

(10) Patent No.: US 9,269,266 B2
(45) Date of Patent: Feb. 23, 2016

(54) METHOD FOR PROVIDING LANE INFORMATION AND APPARATUS FOR EXECUTING THE METHOD

(75) Inventors: Dae Myung Kim, Seoul (KR); Hyung Joon Kim, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 576 days.

(21) Appl. No.: 12/933,984

(22) PCT Filed: Jun. 29, 2008

(86) PCT No.: PCT/KR2008/003787
§ 371 (c)(1),
(2), (4) Date: Sep. 22, 2010

(87) PCT Pub. No.: WO2009/119943
PCT Pub. Date: Oct. 1, 2009

(65) Prior Publication Data
US 2011/0015859 A1    Jan. 20, 2011

(30) Foreign Application Priority Data
Mar. 25, 2008   (KR) .................. 10-2008-0027558

(51) Int. Cl.
G01C 21/00 (2006.01)
G08G 1/0969 (2006.01)
G01C 21/36 (2006.01)

(52) U.S. Cl.
CPC .......... *G08G 1/0969* (2013.01); *G01C 21/3658* (2013.01)

(58) Field of Classification Search
CPC .................. G08G 1/0969; G01C 21/3658
USPC .................................. 701/201, 200, 400
See application file for complete search history.

(56) References Cited

U.S. PATENT DOCUMENTS

| | | | |
|---|---|---|---|
| 6,269,304 B1* | 7/2001 | Kaji et al. | 701/533 |
| 7,502,685 B2* | 3/2009 | Nakamura | 701/437 |
| 2002/0013659 A1* | 1/2002 | Kusama | 701/211 |
| 2007/0192020 A1 | 8/2007 | Brulle-Drews et al. | |

FOREIGN PATENT DOCUMENTS

| | | |
|---|---|---|
| EP | 1085299 A2 | 3/2001 |
| JP | 2004-340826 A | 12/2004 |
| JP | 2006-023158 A | 1/2006 |
| JP | 2007-140033 A | 6/2007 |
| KR | 10-2003-0050765 A | 6/2003 |
| KR | 10-2004-0050549 A | 6/2004 |

* cited by examiner

*Primary Examiner* — Maceeh Anwari
(74) *Attorney, Agent, or Firm* — Fox Rothschild LLP

(57) ABSTRACT

Provided are a method and apparatus for providing lane information, the apparatus including: a database to store and maintain, for each intersection point, a three-dimensional (3D) extension screen for displaying an actual lane and lane information corresponding to each lane; and a lane guide unit to verify an intersection point existing in a predetermined route and provide a lane guide screen where lane information of the intersection point is mapped on a corresponding 3D extension screen.

4 Claims, 4 Drawing Sheets

METHOD FOR PROVIDING LANE INFORMATION AND APPARATUS FOR EXECUTING THE METHOD

CROSS-REFERENCE TO RELATED APPLICATIONS

This application is the U.S. national stage application of International Patent Application No. PCT/KR2008/003787, filed Jul. 29, 2008, which claims priority to Korean Application No. 10-2008-0027558, filed Mar. 25, 2008, the disclosures of each of which are incorporated herein by reference in their entirety.

TECHNICAL FIELD

The present invention relates to a system for providing a route guide service, and more particularly, to a method of providing road lane information with respect to an intersection point while being driven, and an apparatus for executing the method.

BACKGROUND ART

Generally, a navigation terminal is a system that provides information for driving of a transportation device, such as a vehicle, using an artificial satellite. The navigation terminal is also referred to as an automatic navigation system.

The navigation terminal may receive data from a Global Positioning System (GPS) satellite orbiting the earth, using a GPS receiver, to calculate its own location based on the received data.

The navigation terminal may provide various types of information, such as informing a user of a current location of a vehicle based on location information of the navigation terminal, routing a travel route from the current location to the user's desired destination, and guiding the user along the travel route.

When an intersection point to be passed through on the road is approaching, the navigation terminal may inform the user of lane information associated with the intersection point so that the user may safely change a lane. The intersection point may correspond to a point where a one way road of at least two lanes is connected to an entrance/exit of a highway or to a one way road of at least three lanes.

However, an existing navigation terminal may guide lane information using a two-dimensional (2D) image in order to express a road lane guide. Guiding of the lane is closely associated with an actual driving road. Therefore, when simply expressing the lane guide using the 2D image, it may cause confusion to the user.

Also, the most important region in actual driving may be an intersection point where the user may need to change the lane using a left turn, a U turn, a right turn, and the like. However, when providing the lane guide using the existing 2D image, lane information of the road may be verified only when closely approaching the intersection point. Until the user reaches the intersection point, the existing navigation terminal may guide road lane information associated with a current location of the user.

DISCLOSURE OF INVENTION

Technical Goals

An aspect of the present invention provides a new method of providing lane information that may more effectively and practically provide a road lane guide.

Another aspect of the present invention also provides a method of providing lane information that enables a user to more quickly and safely recognize a driving lane and thereby cope with a road situation in advance.

Technical Solutions

According to an aspect of the present invention, there is provided an apparatus for providing lane information, including: a database to store and maintain, for each intersection point, a three-dimensional (3D) extension screen for displaying an actual lane and lane information corresponding to each lane; and a lane guide unit to verify an intersection point existing in a predetermined route and provide a lane guide screen where lane information of the intersection point is mapped on a corresponding 3D extension screen.

In this instance, the lane guide unit may verify an approaching distance to the intersection point to provide the lane guide screen according to the approaching distance at least once.

Also, the lane guide unit may include: a location verification unit to verify a current location and an intersection point existing within a predetermined setting distance based on the current location; and a screen creator to create the lane guide screen about the verified intersection point when the intersection point existing within the setting distance is verified.

Also, when the intersection point existing within the setting distance is not verified, the screen creator may create a route guide screen including map information for guiding the route.

Also, the lane guide unit may further include a route verification unit to verify a target driving lane among lanes of the intersection point. The screen creator may create the lane guide screen to display lane information corresponding to the target driving lane in a different form from lane information of other lanes.

Also, the lane information of the target driving lane may be displayed in a color different from the lane information of other lanes, or in a blinking form.

Also, the location verification unit may verify an approaching distance to the intersection point existing within the setting distance with respect to the intersection point. The screen creator may include distance guidance information for displaying the approaching distance to the intersection point in real time to thereby create the lane guide screen.

According to another aspect of the present invention, there is provided a method of providing lane information, including: storing and maintaining, for each intersection point, a 3D extension screen for displaying an actual lane and lane information corresponding to each lane; and verifying an intersection point existing in a predetermined route to provide a lane guide screen where lane information of the intersection point is mapped on a corresponding 3D extension screen.

Advantageous Effect

According to embodiments of the present invention, it is possible to guide lane information associated with an intersection point in advance before entering the intersection point in order to reduce a chance of an accident caused by changing lanes and thereby provide a more secure information guide.

Also, according to embodiments of the present invention, it is possible to three-dimensionally provide lane information of an intersection point and provide lane information associated with a driving lane that a user enters to be displayed in a different way from other lanes and thereby improve a visibility of a driving lane guide through more practical and effective lane guide and help the user to quickly recognize the lane.

BEST MODE FOR CARRYING OUT THE INVENTION

Figure 1:
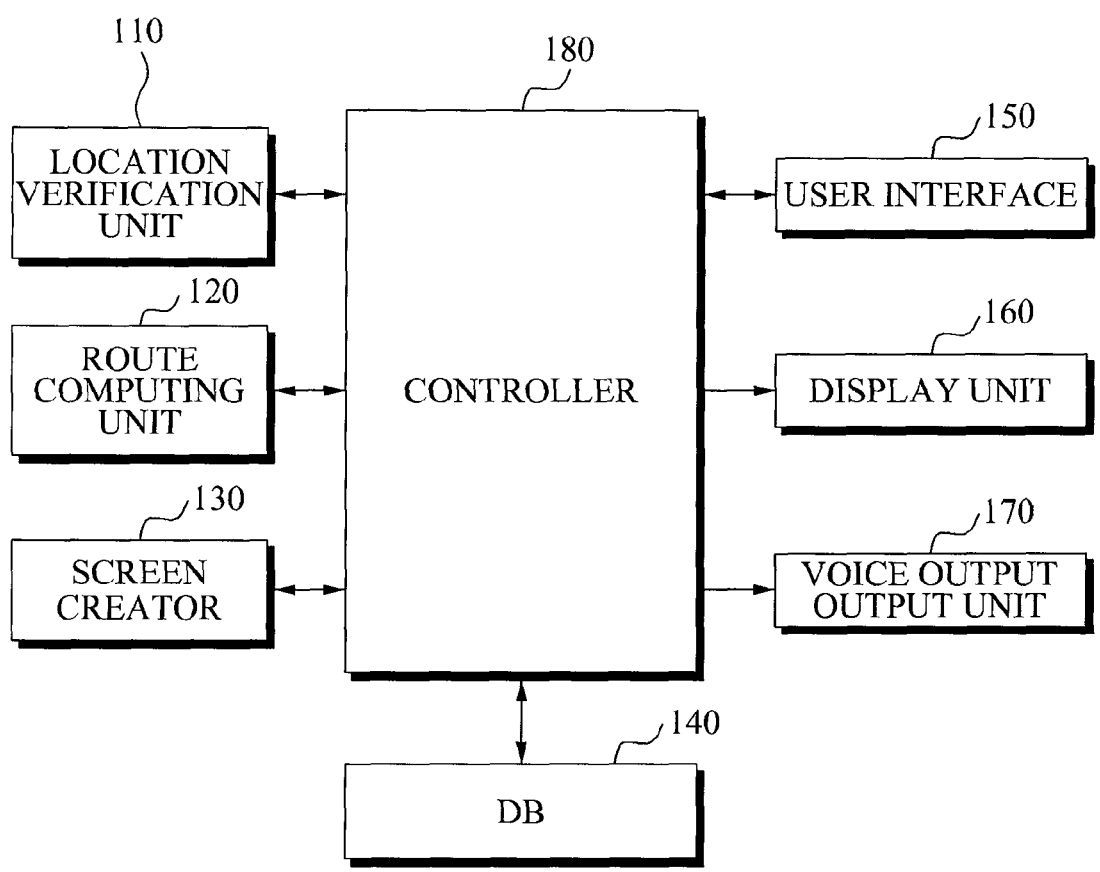
FIG. 1 is a block diagram illustrating an internal configuration of an apparatus for providing lane information of a road according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, an apparatus and method for providing lane information according to an embodiment of the present invention will be described with reference to the accompanying drawings.

The present invention is to provide a three-dimensional (3D) road lane guide in advance in a predetermined distance prior to an intersection point. In particular, there is provided a method that may map lane information corresponding to each lane of the intersection point with an actual lane location using a 3D extension view and also may display lane information associated with a driving lane of a user in a different form from other lanes and thereby enabling the user to more safely change the lane.

The term "intersection point" used herein may be an object for a road lane guide. The intersection point may include at least one entrance/exit to make it possible to moving from a current road to another road. Also, the intersection point may correspond to a point where the current road and at least one another road intersect to make it possible to move from the current road to the other road.

For example, the intersection point may correspond to a point where a one way road of at least two lanes is connected to an entrance/exit of a highway or to a one way road of at least three lanes.

FIG. 1 is a block diagram illustrating an internal configuration of an apparatus for providing lane information of a road according to an embodiment of the present invention.

The apparatus for providing lane information may be applicable to a navigation terminal that includes a Global Positioning System (GPS) module. The GPS module may receive a location signal from a GPS satellite to calculate its own location.

The lane information providing apparatus may include a database 140 and a lane guide unit.

The database 140 may store and maintain map data associated with a national map and route guide data associated with the map data. In particular, the database 140 may store and maintain, for each intersection point, a 3D extension screen for displaying an actual lane and lane information corresponding to each lane in association with a location of the intersection point. The 3D extension screen may construct, as a 3D vector image, a current road lane and actual lanes associated with an entrance/exit constituting the intersection point.

The lane guide unit may verify the intersection point existing in a predetermined route and then provide a lane guide screen associated with the intersection point based on information stored in the database 140.

The lane guide unit may include a location verification unit 110, a route computing unit 120, a screen creator 130, a user interface 150, a display unit 160, a voice output unit 170, and a controller 180.

The location verification unit 110 includes a GPS module and thus may receive data from a GPS satellite and verify a current location based on the received data. Also, the location verification unit 110 may verify a location of an intersection point existing within a setting distance based on the current location, or may verify an approaching distance to the intersection.

The route computing unit 120 may search for a travel route to a predetermined destination designated by the user, based on the verified current location and generate route information associated with the found travel route. Also, the route computing unit 120 may verify a target driving lane for guiding entry of the user with respect to the intersection point existing in the travel route.

The screen creator 130 may create a route guide screen including map information for guiding the travel route. The screen creator 130 may map lane information associated with each lane of the intersection point with a corresponding lane location of the 3D extension screen and thereby create the lane guide screen associated with the intersection point existing within the setting distance.

The screen creator 130 may create the lane guide screen to display lane information corresponding to the target driving lane in a different form from lane information of other lanes. In this instance, the screen creator 130 may display the lane information of the target driving lane in a color different from the lane information of the other lanes, or may display the lane information of the target driving lane in a blinking form using a blinking display function of animation. Also, the screen creator 130 may create the lane guide screen that displays distance guidance information in real time in order to verify the approaching distance to the intersection.

The display unit 160 may display various types of contents associated with an overall system operation, map information for route guide, and the lane guide screen for the road lane guide in association with a predetermined travel route. The display unit 160 may use a liquid crystal display (LCD), an electro luminescence (EL), and the like.

The user interface 150 may be used to input a user command such as a destination and the like. The user interface 150 and the display unit 160 may be integrated into a touch pad to thereby provide a user graphic interface unit. Specifically, it is possible to provide all the menus related to system operations such as a route guide, a road lane guide, and the like, via the display unit 160 and to input the user command by touching a particular location of the graphic screen using a stylus pen, a finger, and the like.

The voice output unit 170 may perform a predetermined voice guide for the route guide. The voice output unit 170 may output a voice signal for guiding an approach of the intersection point and the target driving lane.

The controller 180 may control system operations including a route guide function with respect to the travel route and a road lane guide function with respect to the intersection point existing in the travel route.

Hereinafter, a method of providing lane information according to the above configuration will be described in detail.

Figure 2:
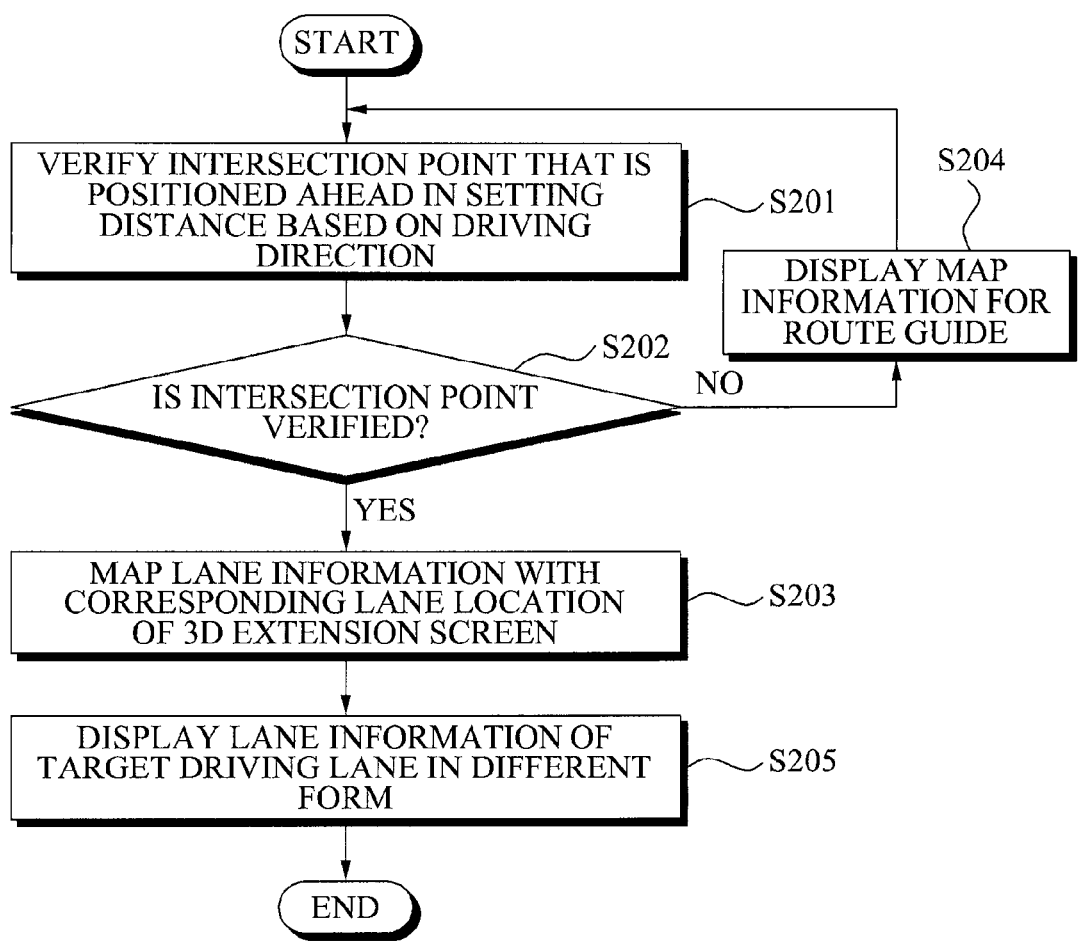
FIG. 2 is a flowchart illustrating a method of providing lane information of a road according to an embodiment of the present invention.

FIG. 2 is a flowchart illustrating a method of providing lane information of a road according to an embodiment of the present invention.

A lane information providing apparatus according to an embodiment of the present invention may store and maintain, for each intersection point, a 3D extension screen displaying actual lane and lane information corresponding to each lane in association with a location of the intersection point.

In operation S201, the lane information providing apparatus may verify an intersection point that is positioned ahead in a predetermined setting distance based on a driving direction of a user, among intersection points existing in a travel route.

When the intersection point positioned ahead in the predetermined setting distance is verified in operation S202, the lane information providing apparatus may map lane information associated with each lane of the verified intersection point with a corresponding lane location of the 3D extension screen in operation S203.

Conversely, when the intersection point is not verified in operation S202, the lane information providing apparatus may display map information for a route guide along the travel route in operation S204.

Figure 3:
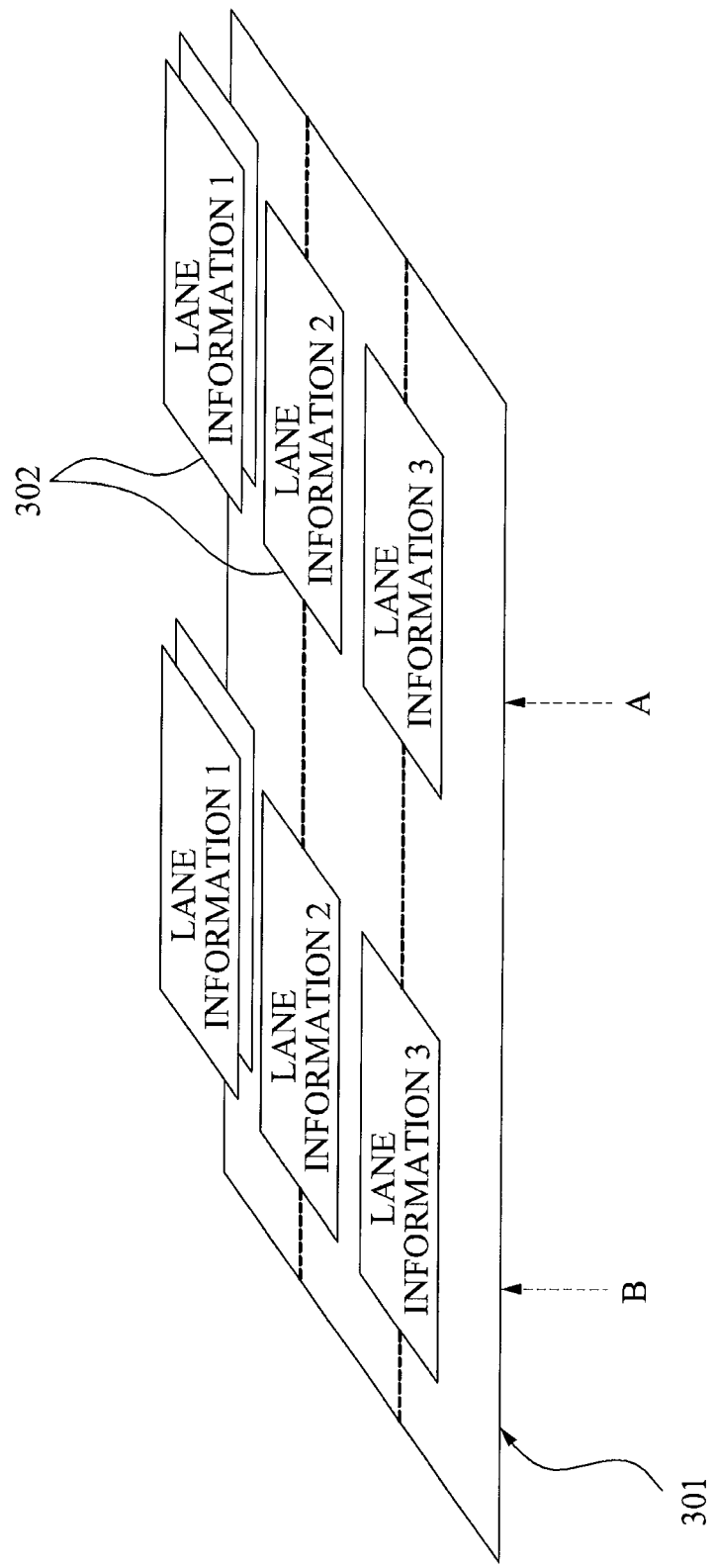
FIG. 3 illustrates an example for explaining a road lane guide scheme adopting a three-dimensional (3D) extension screen according to an embodiment of the present invention.

FIG. 3 illustrates an example for explaining a road lane guide scheme adopting a 3D extension screen 301 according to an embodiment of the present invention. As shown in FIG. 3, the lane information providing apparatus may read the 3D extension screen 301 of the intersection point and lane information 302 associated with each lane of the intersection point and directly map the lane information 302 of each corresponding lane on each lane location of the 3D extension screen 301 so that the road lane of the intersection point may be expressed as similar as the actual lane. In this instance, the lane information providing apparatus may map the lane information 302 with at least one point of the 3D extension screen 301. For example, the lane information providing apparatus may display the lane information 302 on two different points A and B that are spaced apart from each other by a predetermined distance on the 3D extension screen 301.

In operation S205, the lane information providing apparatus may verify a target driving lane for guiding a user entry along the travel route in the intersection point, and then display lane information corresponding to the target driving lane in a different display form from lane information of other lanes. The lane information providing apparatus may display the lane information of the target driving lane in a color different from the lane information of the other lanes or in a blinking form using a blinking display function of animation.

In operations S203 and S205, the lane information providing apparatus may apply lane information of each lane on the 3D extension screen to thereby create the lane guide screen associated with the intersection point.

Figure 4:
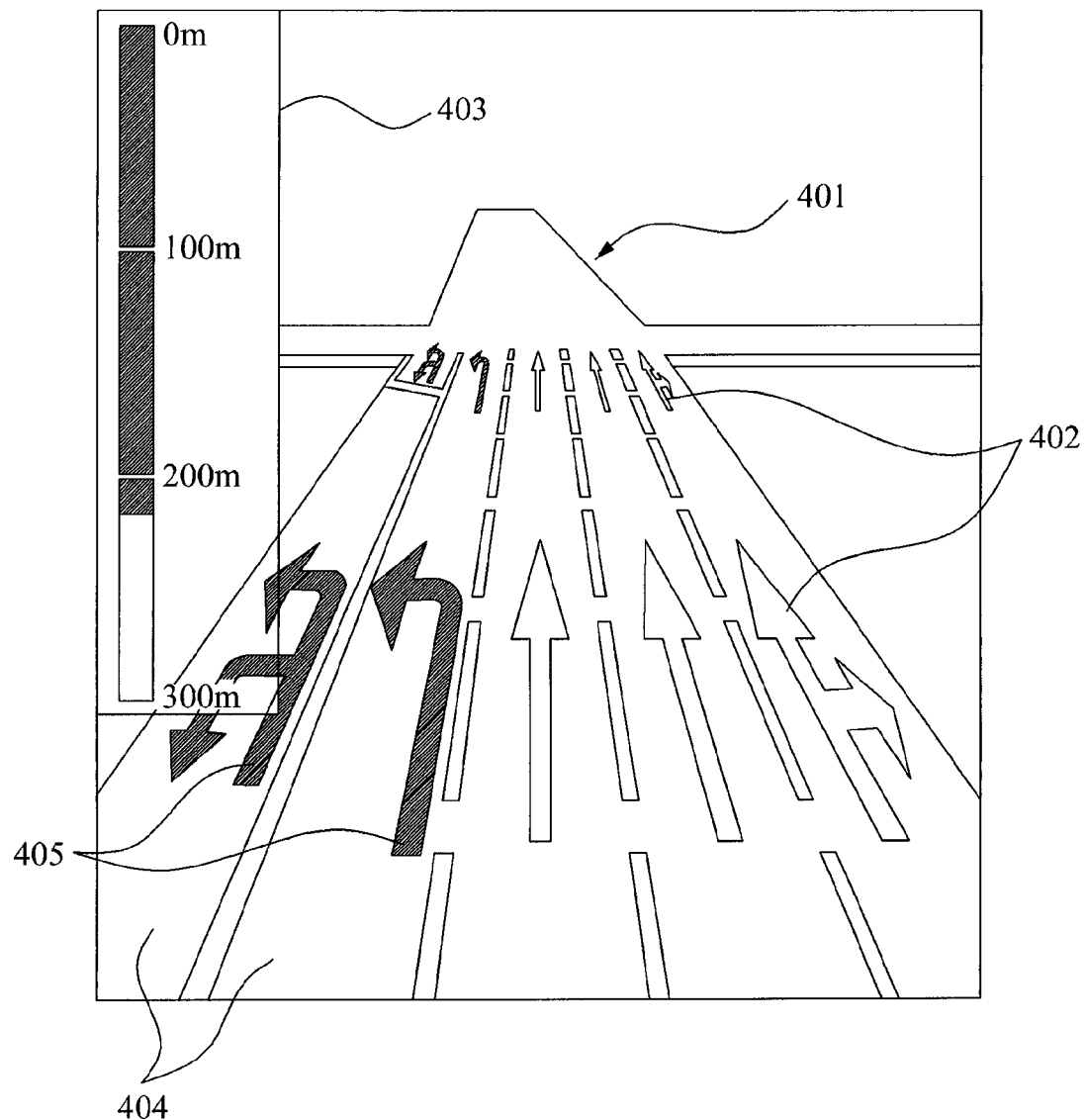
FIG. 4 illustrates an example of a lane guide screen providing lane information using a 3D extension screen according to an embodiment of the present invention.

FIG. 4 illustrates an example of a lane guide screen that is provided for a user for road lane guide about an intersection point according to an embodiment of the present invention.

When an intersection point positioned ahead in a predetermined setting distance is detected, a lane information providing apparatus may display a lane guide screen for a road lane guide via a predetermined display unit. The lane information providing apparatus may verify the intersection point that is positioned ahead in the setting distance, based on a current location of a user. Next, as shown in FIG. 4, at a point in time when the intersection point is verified, the lane information providing apparatus may display the lane guide screen including lane information 402 and 405 on a 3D extension screen 401. In this instance, in order to guide a driving direction in the intersection point, the lane information providing apparatus may display an available lane into the driving direction, that is, lane information 405 of a target driving lane 717 to be different from lane information 402 of the other lane. For example, when displaying the lane information 405 of the target driving lane 404 in a blinking animation form, the user may quickly recognize the target driving lane 404. The lane information driving apparatus may provide road lane information via the lane guide screen in advance at the setting distance before reaching the intersection point and thereby enable the user to change the lane in a safer location.

The lane information providing apparatus may periodically verify the approaching distance to the intersection point and provide the lane guide screen according to the approaching distance at least once. For example, the lane information providing apparatus may provide the lane guide screen twice at points where the approaching distance to the intersection point is about 300 m and about 150 m.

Also, the lane information providing apparatus may periodically provide the lane guide screen until a moving object reaches the corresponding intersection point ahead of the setting distance. In this instance, the lane information providing apparatus may verify the approaching distance to the intersection point and display distance guidance information 403, indicating the approaching distance to the intersection point, on the lane guide screen. The lane information providing apparatus may display the approaching distance to the intersection point in real time using the distance guidance information 403 and thereby enable the user to easily recognize a remaining distance to the intersection point.

According to embodiments of the present invention, it is possible to perform a road lane guide by displaying lane information on a 3D extension screen associated with a corresponding intersection point in a predetermined setting distance prior to the intersection point and thereby more safely and practically express lane information. In particular, it is possible to provide the road lane guide in advance in the predetermined setting distance prior to the intersection point and to display the driving lane in a different form from other lanes and thereby enable the user to more quickly and effectively recognize the driving lane without a need of sudden lane changing in the intersection point.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for providing lane information, comprising:
   a storage configured to store map data;
   a display configured to display a map having lanes on a screen by using the map data and to display a 3D extension screen and a subscreen; and
   a controller configured to:
      verify an intersection that is positioned ahead in a predetermined setting distance based on a driving direction of a car, among intersection points existing in a travel route, and
      control the display to display lane information in the 3D extension screen for each of the lanes at the verified intersection point, wherein the lane information is positioned over each of the lanes at the verified intersection point, wherein lane information of a target driving lane is differently displayed than other lane information positioned over other lanes, and wherein the subscreen displays distance information to the intersection point.

2. The apparatus of claim 1, wherein the controller is further configured to periodically provide the lane information until the apparatus reaches the intersection point ahead of a setting distance using the display.

3. A method for providing lane information, comprising:
   storing map data;
   displaying a map having lanes on a screen by using the map data and route guide data on a screen;
   verifying an intersection that is positioned ahead in a predetermined setting distance based on a driving direction of a car, among intersection points existing in a travel route; and
   displaying lane information in a 3D extension screen for each of the lanes at the verified intersection point, wherein the lane information is positioned over each of the lanes at the verified intersection point, wherein lane information of a target driving lane is differently displayed than other lane information being positioned over other lanes; and
   displaying a subscreen on the screen in which the subscreen displays distance information to the intersection point.

4. The method of claim 3, wherein the displaying lane information step further includes periodically providing the lane information until the apparatus reaches the intersection point ahead of a setting distance.

* * * * *